Figure 2:
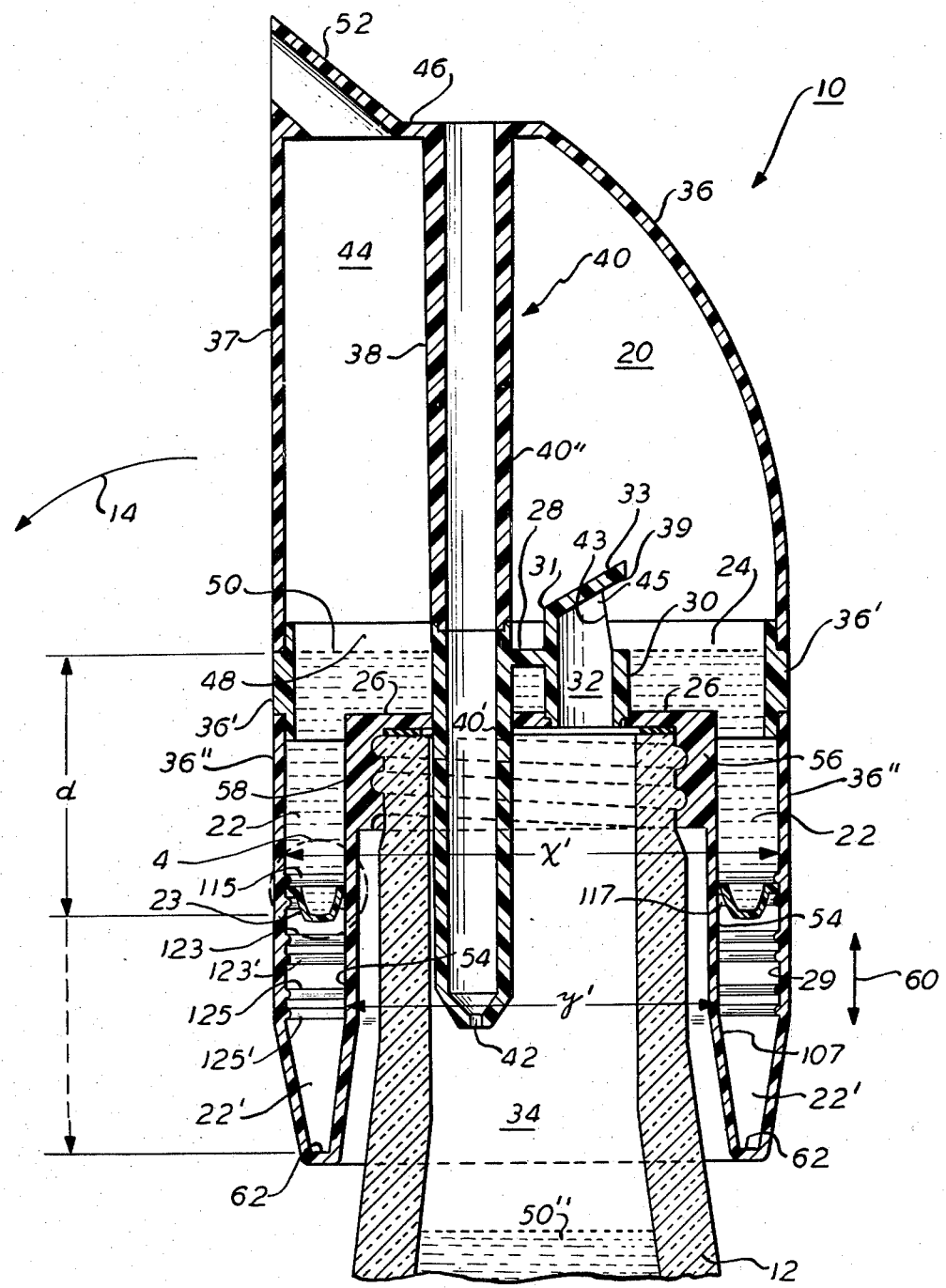

United States Patent [19]

Towns et al.

[11] 4,226,341
[45] Oct. 7, 1980

[54] VOLUME ADJUSTMENT DEVICE

[75] Inventors: Edward J. Towns, Convent Station; Edward M. Brown, Livingston, both of N.J.

[73] Assignee: Neil H. Downing, Bedford Hills, N.Y.

[21] Appl. No.: 870,472

[22] Filed: Jan. 18, 1978

[51] Int. Cl.² .......................................... G01F 11/26
[52] U.S. Cl. .................................... 222/440; 73/429
[58] Field of Search ............. 222/305, 306, 307, 438, 222/440; 73/429; 220/22.1, 93

[56] References Cited

U.S. PATENT DOCUMENTS 3,924,774  12/1975  Donnelly .............................. 220/93

FOREIGN PATENT DOCUMENTS 769271  6/1934  France ......................................... 220/93
284123  7/1952  Switzerland ............................... 73/429

Primary Examiner—David A. Scherbel
Assistant Examiner—Frederick R. Handren

[57] ABSTRACT

A device which may be used with a liquid metering and dispensing spout, includes a fluid receptacle having an upstanding annular side wall extending from a bottom wall, forming a given volume. The side wall has vent projection protruding therefrom. A volume determining member axially slideable in the receptacle has a tapered resilient side wall which is radially inwardly compressed by and forms a seal with the inner surface of the receptacle side wall to form a settable bottom wall for the receptacle. The side wall of the member engages the vent projection during its insertion to permit entrapped gas to escape between the side walls as the member is slid to a predetermined volume position.

9 Claims, 7 Drawing Figures

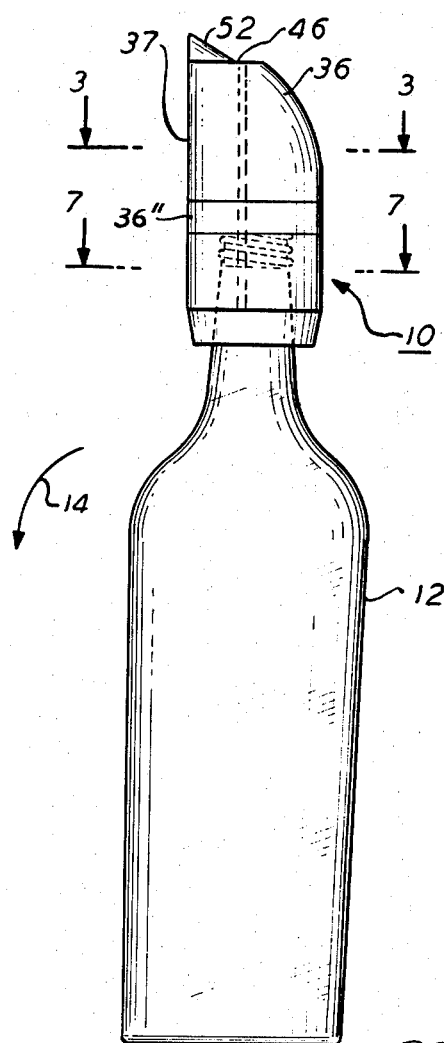
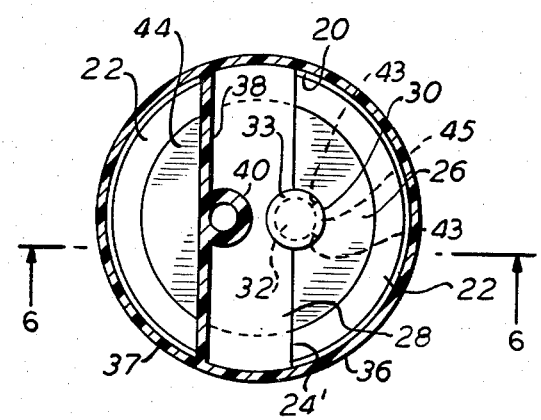
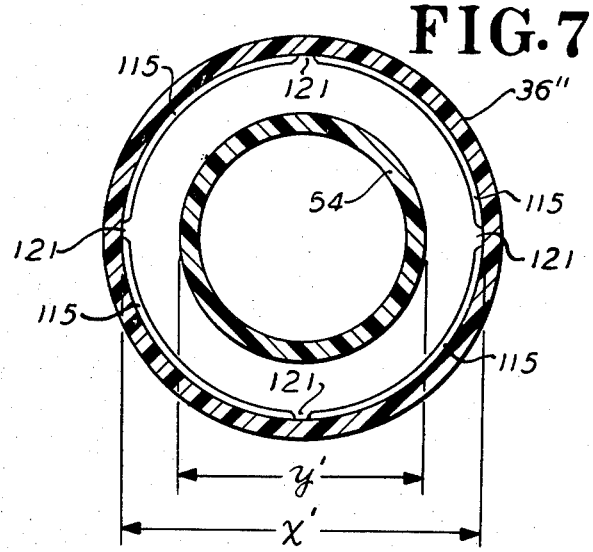
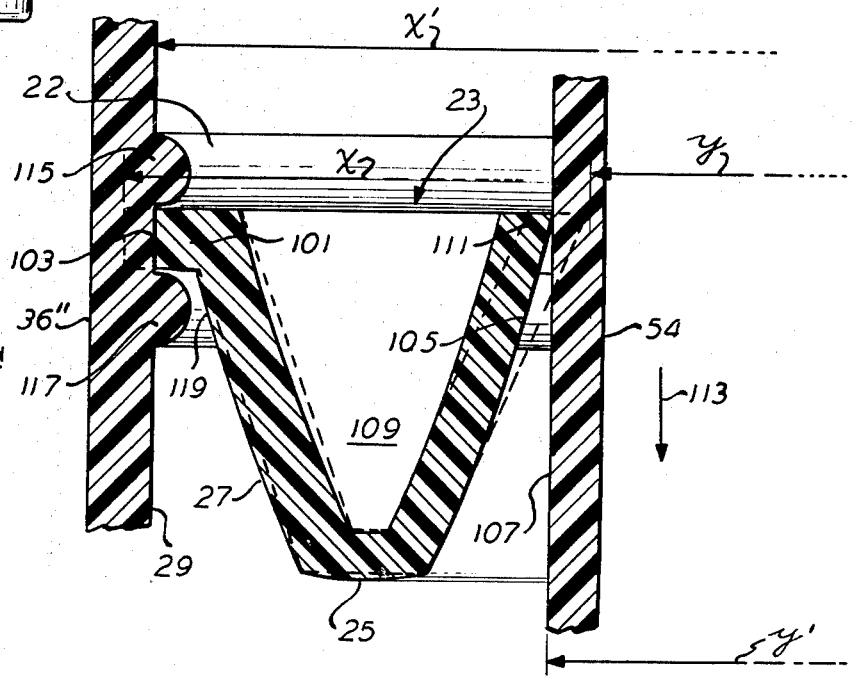

VOLUME ADJUSTMENT DEVICE

The present invention relates to devices for providing a desired volume in a fluid chamber.

Prior art metering and dispensing devices include multiple chamber spouts which are adapted to be secured to a container or bottle for dispensing a measured volume of liquid from the container. In these devices, one chamber is usually placed over another and arranged in fluid communication with each other.

The container interior and chambers are oriented such that fluid is poured into one of the chambers when the container is inverted. When the container is uprighted, the fluid in the one chamber is dumped into a second lower chamber. The lower chamber may provide the measured volume of fluid.

One such system is described in our copending application entitled "Metering Device and Method", Ser. No. 729,995, filed Oct. 6, 1976, by Neil Hugh Downing et al. and assigned to the assignee of the present invention. In that apparatus, there is disclosed an intermediate member which determines the measured volume. A separate different intermediate member is required for each different volume to be measured. This arrangement requires multiple differently configured intermediate members to provide different volumes.

Other devices are known in the art for providing adjustment of volumes in such metering and measuring caps, including adjustable chamber means which alter the volume of the measuring chamber. These devices require relatively complex moving parts.

Devices which are not adjustable are manufactured to different predetermined measuring volumes in accordance with the desired volume to be provided. This arrangement requires a different configured device for each desired volume.

Of interest is the following copending application assigned to the assignee of the present invention: Application Ser. No. 780,106, filed Mar. 22, 1977, now U.S. Pat. No. 4,116,371 entitled "Metering Device and Method", invented by Edward J. Towns et al.

A volume setting device for setting the volume of a chamber includes a member which is engaged with a chamber wall and forms a fluid receptable therewith. The member's position can be set to provide a volume in that chamber different than the chamber volume. The member has a resilient tapered side wall which forms the seal and which permits entrapped gas between the member and the chamber to escape as the member is adjusted.

Figure 5:
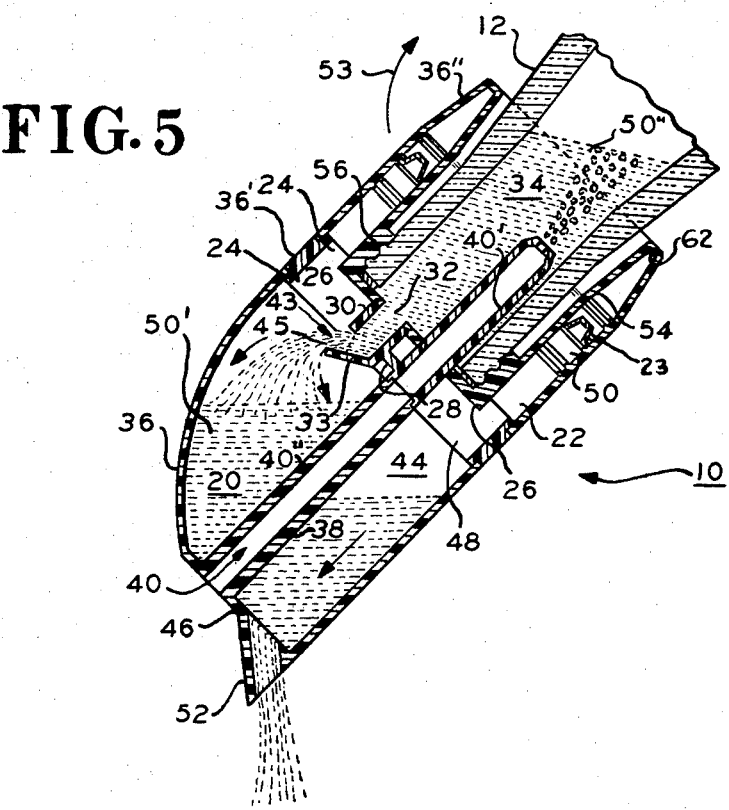
Figure 6:
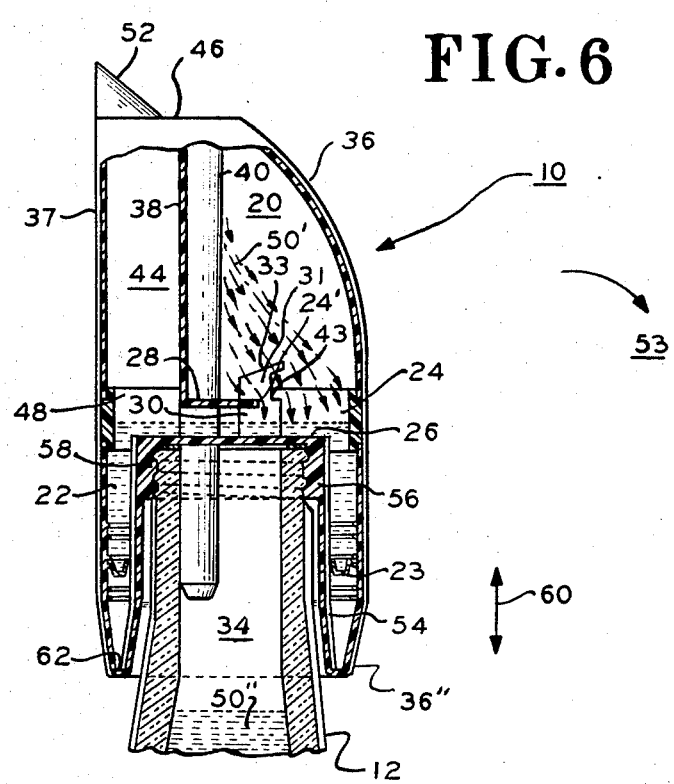

In The Drawing:

FIG. 1 is an elevation view of a pouring and measuring spout embodying the present invention, FIG. 2 is an elevation sectional view through the device of FIG. 1, FIG. 3 is a plan sectional view through the device of FIG. 1 taken along lines 3—3, FIG. 4 is an enlarged sectional view of the encircled portion of the embodiment of FIG. 2, FIGS. 5 and 6 are elevation sectional views of the spout of FIG. 1 illustrating the operation of the spout, and FIG. 7 is a plan view of the spout of FIG. 1 taken along lines 7—7.

In FIG. 1, metering spout 10 is threaded to a bottle 12 or other suitable container and is shown in the upright position with respect to gravity. The spout 10 is a passive device (no moving parts) which automatically provides a measured volume of liquid stored in bottle 12 when the bottle 12 is inverted in direction 14 from the position shown to the pour position. Each time the bottle is placed in the upright position spout 10 stores and measures a volume of liquid which is almost instantaneously dispensed when the bottle 12 is tipped to the inverted position. The measure is determined by lower chamber 22 FIG. 2 as will be described. This volume can be preset by a simple adapter ring 23 to be described located in chamber 22. The adapter ring 23 forms a fluid tight bottom wall for chamber 22 in accordance with its preset position in chamber 22. When the bottle 12 is in the upright position the spout 10 is ready to pour the premeasured volume stored in chamber 22.

Spout 10 includes an upper storage chamber 20 and a lower liquid volume measuring chamber 22 in fluid communication with upper chamber 20 through dump opening 24. Chamber 20 is formed by bottom wall 28, outer wall 36, and inner upstanding side wall 38 which is joined to wall 36 at the sides and top, and to bottom wall 28 at the wall 36 lowermost edge. Opening 24 is formed by the edge 24' (FIG. 3) of wall 28 and by wall 36'. As can be seen in FIGS. 2 and 3, a large portion of chamber 22 is open to chamber 20.

Wall 28 is a relatively narrow planar strip which extends across the opening formed by wall 36 approximately centrally in plan as seen in FIG. 3. One edge (elongated) of wall 28 is integral with wall 38 forming a fluid seal therebetween. The opposite narrow ends of wall 28 are joined to wall 36. The edge 24' is cantilevered above wall 26 forming the opening 24. Integral with wall 38 is vent tube 40 which extends between wall 46 and the bottle 12 interior 34. The exterior wall of tube 40 is integral with wall 38 and thus also forms a wall of chamber 20. Vent tube 40 is open at the upper end (through wall 46) to the ambient and at the lower end (in interior 34) tapers to a small vent aperture 42. Wall 38 with tube 40 divides the upper interior volume of the spout into a second chamber 44 which is further formed by outer wall 37 and top wall 46. There is an opening 48 between chambers 44 and 22. This opening permits immediate emtpying into chamber 44 of the liquid 50 stored in chamber 22 when the spout is tipped in direction 14 as will be explained. Disposed in top wall 46 is suitable apertured nozzle 52 for dispensing the measured volume of liquid 50 from chamber 44 when the spout is tipped in direction 14.

Chamber 22 is ring shaped and straddles the upper neck of bottle 12. The outer wall of chamber 22 is formed by cylindrical walls 36" and 36'. Wall 36" depends downwardly from intermediate wall 36' which depends from walls 36 and 37. The lowermost edge of wall 36" is joined to an inner concentric substantially cylindrical wall 54 via bottom wall 62. Inner wall 54 terminates at its upper end in a relatively thicker internally threaded section 56 to receive the bottle 12 threads. A gasket 58 is disposed between the bottle 12 upper lip and the underside of bottom wall 26. Tube 40 extends through wall 26 in a fluid tight seal with wall 26. Thus no fluid flows between the tube 40 and wall 26. Wall 26 is essentially a circular disk which forms a bottom wall for chamber 22 within the central area formed by wall 54.

The volume adjustment device, FIG. 4, includes ring 23 whose position is set in chamber 22. Ring 23 has a bottom ring-like circular wall 25 whose width from left to right in the drawing is smaller than the spacing between the outer wall 36" and the inner wall 54. Upstanding from the bottom wall 25 is an outer annular resilient wall 27 which tapers upwardly toward the inner surface 29 of wall 36". The upper end of wall 27 is formed with a rim 101. The rim 101 has an outer surface 103 which abuts surface 29 and forms a fluid seal therewith.

A second resilient wall 105 extends from bottom wall 25 tapering upwardly toward the surface 107 of wall 54. The upper edge of the tapered wall 105 forms a fluid tight seal with surface 107. The walls 105, 27 and 25 form an upstanding channel 109 serving as the bottom of chamber 22. The axial position of the device 23 in the directions 60 (FIG. 2) determines the volume of chamber 22, by way of the spaced relationship, distance d, of ring 23 with the upper surface of wall 28. The ring 23 forms a fluid tight seal between both the inner surface 29 and inner surface 107 of the walls 36" and 54, respectively, to effectively form a settable bottom for chamber 22.

Ring 23 when separated from chamber 22 has an outer diametrical dimension x (FIG. 7) at the upper edge of rim 101 which is slightly greater than the inner diametrical dimension x' formed by annular surface 29. The inner diametrical dimension y for rim 111 of wall 105 is slightly smaller than the outer diametrical dimension y' of wall 54. The original free standing relation of ring 23 is shown dashed FIG. 4. When the ring 23 is inserted in the direction 113 in chamber 22, the walls 27 and 105 at rims 101 and 111, respectively, are compressed toward each other as shown in solid FIG. 4. The walls 27 and 105 are resilient and tend to return to the dashed position when in the free state after being compressed as shown in FIG. 4. The resilient compression of the rims 101 and 111 provide a seal against the respective wall surfaces 29 and 107 of chamber 22.

The adjustment ring 23 is made sufficiently thin in section and is of a sufficiently resilient material to permit bending of walls 25, 27 and 105. Preferably, the material is molded of thermoplastic material such as a polyolephin having the resiliency, stiffness and flexibility of general purpose polyethylene having a high melt index. The walls 54 and 36" are relatively rigid. While ring 23 is shown hollow, it could also be made solid in which the walls 27 and 105 are the exterior surfaces of such a solid. The resiliency permits the walls 25, 27 and 105 to slightly distort as shown solid, FIG. 4. This distortion prevents the walls 27 and 105 from wrinkling when inwardly compressed. This action permits the rims to maintain the seal against the surfaces 29 and 107. If the material is made too rigid, then the ring 23 may not be readily inserted into chamber 22 and if made too soft, may provide inadequate sealing.

The inner surface 29 of wall 36" is formed with a plurality of sets of annular raised ridges, 115, 117; 123, 123'; and 125, 125'. The ridges are similar so that only ridges 115 and 117 which form one set will be described. Each of the ridges 115 and 117 are approximately semi-circular in section. The spacing between the ridges 115 and 117 is slightly greater than the height of surface 103 of rim 101. This permits the rim 101 to be received between ridges 115 and 117, form a fluid seal with surface 29 and provide accurate location of ring 23 in chamber 22 in direction 113.

The face 103 of rim 101 projects beyond the wall 27 surface 119 an amount sufficient to clear lower ridge 117 and is made concentric with surface 29. This permits face 103 to form a good seal with the surface 29 between ridges 115 and 117 without interference with lower ridge 117.

The ridge 115 does not extend continuously around the chamber. Instead, it is interrupted by circumferentially spaced small gaps 121, FIG. 7. The gaps 121 aid in the expulsion or venting of gas between the ring 23 and the bottom wall 62, as ring 23 is axially displaced in direction 113. Otherwise, a gas such as air would tend to be compressed since the lower part of chamber 22 is fluid tight and at some future time, may "pop" ring 23 from its set position. Therefore, the compressed gas should be expelled or vented from between ring 23 and the wall 62 when ring 23 is inserted to equalize the pressure on each side of ring 23.

The ridges 115 and 117 form a locating detent for locating ring 23 in chamber 22. Any desired number of sets of ridges such as, for example, sets 123, 123'; and 125 and 125', (FIG. 2) may be provided. The upper one of each set includes gaps such as gaps 121. Each set of ridges provides a predetermined desired volume when ring 23 rim 101 is located between that set at a given distance such as distance d from the upper surface of wall 28. One ridge 115 may, in the alternative, be used as a locating device.

While a bottom wall 25 connecting tapered walls 27 and 105 is illustrated, the two walls 27 and 105 may intersect to form a "V" shaped bottom member with no "bottom wall" as such. In the alternative, the ring may be disk shaped instead. The important aspect is that the extended rims be sufficiently stiff to form a good seal and sufficiently resilient to permit escape of entrapped gasses between the device and the sealed chamber whose volume is being effectively reduced in combination with the venting gaps formed in the ridges. The tapered walls permit easy insertion of the ring 23 into the chamber 22. The taper also assists in the venting action as well as provide concentration of the sealing pressures.

In spout 10, conduit 30 extends upwardly from wall 26. Conduit 30 is formed with hole 32 which is in fluid communication between container interior 34 and chamber 20. Conduit 30 may be a cylindrical tube. The edge 24' of wall 28 intersects hole 32 approximately centrally (FIG. 3). Edge 24' is closer to wall 38 than the upstanding edges 43 forming opening 45.

Conduit 30 extends above wall 28 forming an extension 31. A portion of extension 31 facing away from tube 40 is open to chamber 20. The upper end of conduit 30 is capped with a cover 33. Cover 33 is about 45° with the plane of wall 28. Cover 33 overhangs the segment of conduit 30 open to chamber 20 at 39. The extension edges 43 (two) taper as shown to form an enlarged opening between hole 32 and chamber 20. Opening 45 faces away from wall 38 towards wall 36. Cover 33 and extension 31 form a fluid shield as will be explained.

Chamber 22 is elongated in directions 60 and relatively narrow in width between walls 36" and 54 in the transverse direction forming a thin elongated doughnut-like chamber. These walls taper slightly toward each other about 1° for purposes of molding. The chamber is narrowest at the lower end. With such construction small changes in volume of a fluid in chamber 22 produce relatively large changes in depth of fluid. For example, to illustrate this relationship, the spacing between walls 36" and 54 can be about 0.150 inches while the depth (d-dashed) from wall 26 to wall 62 within chamber 22 can be about 1.5 inches. This depth, in the alternative, is determined by the position of ring 23.

Thus, control of the depth d of the liquid 50 in chamber 22 provides a simple, but accurate control of the volume of liquid 50. One determining factor for measuring the volume of liquid 50 in chamber 22 when upright is the distance d of the upper surface wall 28 facing chamber 20 above the inner surface of wall 62 (optional-dashed) or adapter ring 23. Any liquid which may temporarily exist above wall 28 when in the upstanding position, FIG. 2, flows through opening 45 and thence through hole 32 into the container interior 34.

The installation of ring 23 is made with a suitable hollow cylindrical tool which may locate at the upper edge of wall 36''. This tool accurately locates ring 23 between the correct set of ridges by way of the wall 36'' upper edges. Ring 23 is displaced axially in direction 113 (FIG. 4) until the rim 101 sits between a desired set of ridges such as, for example, 115 and 117 determined by the tool configuration. Once fitted, the exact volume of chamber 22 is known. In a measuring device as disclosed herein, the volume of chamber 22 may be, for example, 1, $\frac{1}{2}$, $\frac{3}{4}$ and $\frac{5}{8}$ fluid ounce volumes. The 1 ounce volume may be provided by the full volume of chamber 22 to wall 62. The lesser volumes are provided by ring 23. As a result, a single device such as ring 23, can provide a plurality of different volumes in a tapered chamber. Such a ring 23 is inexpensively manufactured and simple to install. The entire structure of ring 23 flexes after insertion to conform to the restricted opening formed by walls 54 and 36''.

While ridges 115 and 117 are shown as annular, they may also be in the form of dimples or relatively small projections for venting the compressed gas and locating ring 23.

In operation, spout 10 is threaded to bottle 12 so that wall 26 is sealed against the upper lip of the bottle. Except for hole 32, wall 26 completely seals the interior 34 from chambers 20, 22 and 44. At this time there is no liquid in any portion of spout 10. The bottle is inverted, direction 14, with nozzle 52 beneath chamber 44, FIG. 5. The angle to which the spout 10 is inverted is not critical. Liquid 50 within interior 34 pours through hole 32 and opening 45 into chamber 20. Chamber 20 is made larger in volume than chamber 22 with or without ring 23 so that at all times the liquid 50' in chamber 20 will overfill chamber 22 above wall 28. The bottle is held in this position for a few seconds until chamber 20 is filled with liquid 50'. Where chamber 20 is sufficiently greater than chamber 22, chamber 20 can be "filled" when it is partially filled, e.g., when the liquid reaches cover 33, for example, if the partial fill is greater in volume than the volume of chamber 22. This visual determination assumes the spout is transparent. The liquid can, in the alternative, fill chamber 20 and in this case, flow directly into chamber 44 from chamber 20 out nozzle 52 between walls 26 and 28. The bottle is now reverted to the upstanding position of FIG. 6. The liquid 50' in upper chamber 20 almost immediately dumps through opening 24 into lower chamber 22. The liquid may splash onto wall 26 and then spill into chamber 22.

In FIG. 5, in the pour mode, the liquid is contained by a cavity formed by wall 38 and the surrounding upstanding walls formed by walls 36 and 28 (when in the inverted position). As the bottle is reverted to the upstanding position of FIG. 6 it is tilted in direction 53. This tilting action causes the liquid 50' in chamber 20 to slosh against wall 26, cover 33, and extension 31. No liquid enters the opening 45 since the opening 45 is situated above the liquid 50' level when the spout is horizontal (90° from the position of FIGS. 1 and 2). As the bottle and spout are further tilted in direction 53 the liquid flows downward against and over cover 33 and extension 31 side walls, splashing and flowing into opening 24 and into chamber 22. Negligible liquid enters opening 45 during this inverting step.

The return of the bottle to the upright position is relatively quick, a matter of seconds. When in the upright position the liquid will have emptied into chamber 22 via opening 24.

Once in the upright position the liquid 50' overfills chamber 22 into chamber 20 at a level above wall 28 since chamber 20 is larger than chamber 22. None of the liquid flows past ring 23 into the lower chamber 22' between ring 23 and wall 62.

The liquid above wall 28 is excess, flows through opening 45 into hole 32 above wall 28 and returns to interior 34 bottle 12. Because cover 33 and extension 31 prevent the flow of liquid into hole 32 during the uprighting of the bottle, hole 32 can be enlarged and need not have any specific ratio with respect to the size of opening 24. Thus rapid transfer of liquid can take place due to the relatively large openings between chambers and yet provide accurate measurement as determined by the preset position of ring 23 with no moving elements or valves.

While liquids are illustrated, it is apparent that other fluids can be used whether they be a loose granular medium such as salt, sugar, powdery substances, or gasses which are heavier than air and which would fill chamber 22 by gravity action when in the upright position. The flow of the fluid in all cases is by gravity.

It should be apparent that as liquid flows from upper chamber 20 through opening 24 into chamber 22 the volume of liquid formerly in chamber 20 must be displaced by air. This air is provided by vent tube 40.

To dispense the measured volume of liquid 50 stored in chamber 22, the bottle 12 is tipped to the inverted position direction 14 to the position of FIG. 5. Liquid 50 pours almost instantaneously into chamber 44 due to the absence of any restriction between chambers 22 and 44 filling chamber 44 to the extent of the volume of measured volume of liquid 50. This almost instantaneous filling of chamber 44 is important for the reason that when the bottle is tipped in the inverted position it is undesirable that any of the measured liquid 50 flow through opening 24 back into chamber 20 during the pour mode. This action is further prevented by wall 28 which directs the liquid to chamber 44. A relatively smaller aperture is provided in nozzle 52 to conveniently pour the liquid from chamber 44 to a suitable receptacle.

During the emptying of chamber 44 it is apparent that simultaneously therewith chamber 20 is being filled with liquid from interior 34 through hole 32 and opening 45. The relative volume of liquid from chamber 44 with respect to the volume of chamber 20 is made such that chamber 44 will empty prior to chamber 20 filling. The time interval between the emptying of chamber 44 and the filling completely of chamber 20 is preferably set in the range of about 1-2 seconds. It will thus be apparent that the end of the pouring of the measured volume is signaled by a cessation of flow of liquid through nozzle 52 for that set time interval of a few seconds. During that time interval, the bottle 12 may be reverted to the upright position. In this instance, an accurate, premeasured volume of liquid 50 will have been poured and measured by the spout 10.

What is claimed is:

1. A volume setting device comprising:
   a fluid receptacle having an upstanding side wall and a first bottom wall forming an annular fluid chamber having a predetermined volume,
   an annular bottom member having a second bottom wall whose outer diameter is smaller than the diametrical spacing of said side wall,
   said bottom member including a tapered resilient side wall circumscribing said second bottom wall and tapering toward said chamber side wall forming a fluid seal with said chamber side wall at the extended edge of the tapered side wall, said resilient side wall being radially inwardly compressed at said edge by said chamber side wall while maintaining said seal with said chamber side wall, said member being sufficiently resilient to permit a gas entrapped between said receptacle and said bottom member to escape during sliding insertion of said member within said chamber toward said first bottom wall and sufficiently flexible to distort while maintaining its seal with said chamber side wall, said predetermined volume being altered to a given value in accordance with the position of said member in said chamber, and
   vent means projecting from the inner face of said chamber side wall, said extended edge engaging said vent means for venting said entrapped gas from between said first bottom wall and said bottom member as said member is inserted toward said first bottom wall.

2. The device of claim 1 wherein said vent means includes a projection extending radially inwardly from the inner face of said chamber side wall, said projection extending partially around the periphery of said side wall forming a venting gap therein, said edge being located in said chamber by said projection.

3. The device of claim 2 further including a pair of spaced projections for receiving said edge therebetween, said edge being formed with a radially outwardly extending lip which projects beyond said resilient side wall outer surface a distance at least as great as the depth of projection of one of said projections so that said resilient side wall is spaced from said one projection when said edge is between said projections.

4. A volume setting device comprising:
   a circular ring-like bottom wall,
   a pair of upstanding walls extending respectively from the inner and the outer edges of said bottom wall to form a ring-like, approximately cylindrical chamber,
   means for providing an upper level of fluid in said chamber corresponding to a predetermined volume,
   a circular, ring-like bottom member dimensioned to fit within the chamber formed by said bottom and upstanding walls,
   said bottom member including tapered resilient side walls, one resilient side wall located at the outer edge of said member and the other at the inner edge of said member, said resilient side walls being radially inwardly compressed at their extended circumferential rims by said chamber upstanding walls while maintaining a fluid seal with said chamber upstanding walls, said resilient side walls being sufficiently flexible to permit a gas entrapped between said member and its side walls and said bottom wall to escape past said side walls during insertion of said member in said chamber, the position of said bottom member forming said predetermined volume with said upstanding walls and said means.

5. The device of claim 4 further including a spaced projection extending radially from one of said chamber upstanding walls into said chamber for venting said gas from between said chamber bottom wall and said bottom member past said resilient side walls.

6. The device of claim 5 wherein said spaced projection extends intermittently circumferentially around said one chamber upstanding wall.

7. The device of claim 6 further including a pair of projections spaced in a direction toward said ring-like bottom wall extending intermittently around said one chamber upstanding wall.

8. A volume adjustment device comprising:
   a first ring member, said first ring member including a pair of concentric annular upstanding walls extending from said first ring member and forming an annular ring-like fluid chamber with said first ring member,
   a second ring member adapted to fit between said upstanding walls within said chamber, said second ring member including a pair of concentric, resilient, annular upstanding walls, each resilient wall tapering toward a different one of said upstanding chamber walls, the extended rim of the outermost resilient wall having a diametrical dimension, when separated from said chamber, slightly greater than the diametrical inner dimension of the outermost of said chamber walls, the extended rim of the innermost resilient wall having a diametrical dimension when separated from said chamber slightly less than the diametrical outermost dimension of the innermost of said chamber upstanding walls.

* * * * *